(12) United States Patent
Koren et al.

(10) Patent No.: US 6,569,071 B1
(45) Date of Patent: May 27, 2003

(54) RECONFIGURABLE MULTI-SPINDLE APPARATUS

(75) Inventors: Yoram Koren, Ann Arbor, MI (US); Yong-Mo Moon, Ann Arbor, MI (US); Sridhar Kota, Brighton, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/172,841

(22) Filed: Jun. 17, 2002

(51) Int. Cl.[7] .......................... B23Q 3/157; B23C 9/00; B23B 39/16
(52) U.S. Cl. ..................... 483/32; 408/42; 408/46; 409/213
(58) Field of Search ................ 408/42, 46, 48, 408/39; 409/213; 29/50, 26 A; 483/32; 74/665.6 A

(56) References Cited

U.S. PATENT DOCUMENTS

| | | | | |
|---|---|---|---|---|
| 3,652,175 A | * | 3/1972 | Walters et al. | 408/46 |
| 3,682,560 A | * | 8/1972 | Suizu | 408/46 |
| 3,765,786 A | * | 10/1973 | Oeckl | 408/46 |
| 4,162,134 A | * | 7/1979 | Kitagawa | 408/46 |
| 4,163,623 A | * | 8/1979 | Kitagawa | 408/46 |
| 4,179,230 A | * | 12/1979 | Kitagawa | 408/39 |
| 4,185,943 A | * | 1/1980 | Hautau | 408/46 |
| 4,320,997 A | * | 3/1982 | Miyakawa | 408/46 |
| 4,493,595 A | * | 1/1985 | Klein | 408/46 |
| 4,517,857 A | * | 5/1985 | Miyakawa | 74/655 GA |
| 5,277,524 A | * | 1/1994 | Chung | 408/46 |
| 5,344,259 A | * | 9/1994 | Rajala et al. | 408/46 |
| 5,920,973 A | * | 7/1999 | Kosmowski | 29/260 A |
| 5,943,750 A | | 8/1999 | Koren et al. | |
| 6,349,237 B1 | | 2/2002 | Koren et al. | |

FOREIGN PATENT DOCUMENTS

| | | | | |
|---|---|---|---|---|
| DE | 2507662 | * | 9/1976 | 408/46 |
| JP | 57-8008 | * | 1/1982 | 408/46 |
| JP | 62-152605 | * | 7/1987 | 408/42 |

OTHER PUBLICATIONS

Moon, Yong–Mo., and Kota, Sridhar, Automated Synthesis of Mechanisms Using Dual–Vector Algebra, Mechanism and Machine Theory 37 (2002), 143–166.

Modular Design Strategy Lets Automaker Ramp Up Cylinder Head Production Line, Tooling and Production, May 1999.

Spotlight on Powertrain Machining: New Challenges, New Opportunities, LAMBnet, press release.

"PB Plus" Modular Precision Machining System, Ex–Cell–O, Copyright 2001.

Multi Spindle Drilling and Tapping Head, Also for CNC Centres, www.suhner.com/automation/multi.hml.

* cited by examiner

Primary Examiner—William Briggs
(74) Attorney, Agent, or Firm—Kirkpatrick & Lockhart LLP

(57) ABSTRACT

A reconfigurable multi-spindle apparatus for use with a machining device in a plurality of configurations across part families. In one embodiment, the reconfigurable multi-spindle apparatus may include at least two spindle head modules, a mechanism for transmitting power between the spindle head modules, and a mechanism for reconfigurably connecting the spindle head modules such that the multi-spindle apparatus is reconfigured from a first configuration to a second configuration across part families. An embodiment of a spindle head module may include two tool holders and a mechanism for adjusting the distance between the tool holders such that the multi-spindle apparatus is reconfigured within a part family.

30 Claims, 22 Drawing Sheets

RECONFIGURABLE MULTI-SPINDLE APPARATUS

FEDERALLY SPONSORED RESEARCH

Certain of the research leading to the present invention was sponsored by the United States Government under National Science Foundation (NSF) Grant No. EEC 9529125. The United States Government has certain rights in this invention.

BACKGROUND

Current multi-spindle heads for machining operations often include dedicated and general-purpose multi-spindle heads. A dedicated multi-spindle head is custom-designed for a specific product or part and typically cannot accommodate a design change, such as, for example, a change in a pattern of machinable features, including holes, that are characteristic of the part. Thus, whenever the product design is modified, the dedicated multi-spindle head must be replaced.

A general-purpose multi-spindle head may be used for applications that require frequent design changes, but it often can accommodate only a small number of tools, such as, for example, two or three drilling tools and has a complicated adjustment mechanism. Thus, current multi-spindle heads are not cost-effective or efficient for mass producing parts that require frequent changes.

SUMMARY

One embodiment of the invention provides a reconfigurable multi-spindle apparatus for use with a machining device in a plurality of configurations across part families.

The reconfigurable multi-spindle apparatus may include at least two spindle head modules, a mechanism for transmitting power between the spindle head modules, and a mechanism for reconfigurably connecting the spindle head modules such that the multi-spindle apparatus is reconfigured from a first configuration to a second configuration across part families.

An embodiment of a spindle head module may include two tool holders and a mechanism for adjusting the distance between the tool holders such that the multi-spindle apparatus is reconfigured within a part family.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Figure 1:
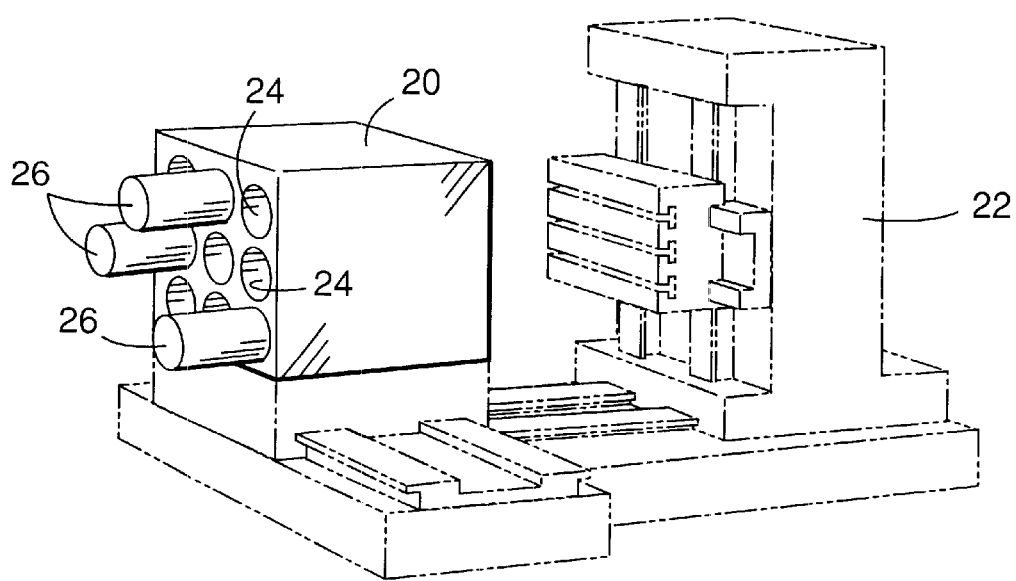
FIG. 1 is an isometric view of an embodiment of a reconfigurable multi-spindle apparatus of the invention shown on a machining device.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

In addition, it will be appreciated that the characterizations of various components and orientations described herein as being "vertical" or "horizontal", "right" or "left", "side", "top" or "bottom", are relative characterizations only based upon the particular position or orientation of a given component for a particular application.

FIG. 1 depicts an embodiment of a reconfigurable multi-spindle head 20 integrated for use with a conventional machining device (machine tool) 22, that may be used for various machining operations, such as, for example, drilling, reaming, tapping, etc. The multi-spindle head 20 may includes a number of tool holes 24 for supporting an equal or lesser number of tools 26. The multi-spindle head 20 may be reconfigured in situ, i.e. without removing it from the machining device 22 or from the production line, by merely changing the arrangement of the tools 26 in the tool holes 24, i.e. by removing a number of tools from their current holes and eliminating them completely or inserting them in different holes. The multi-spindle head 20 may also include integrated or modular mechanisms for different levels of reconfigurability within a part family or across part families, as will be further described below.

Figure 2:
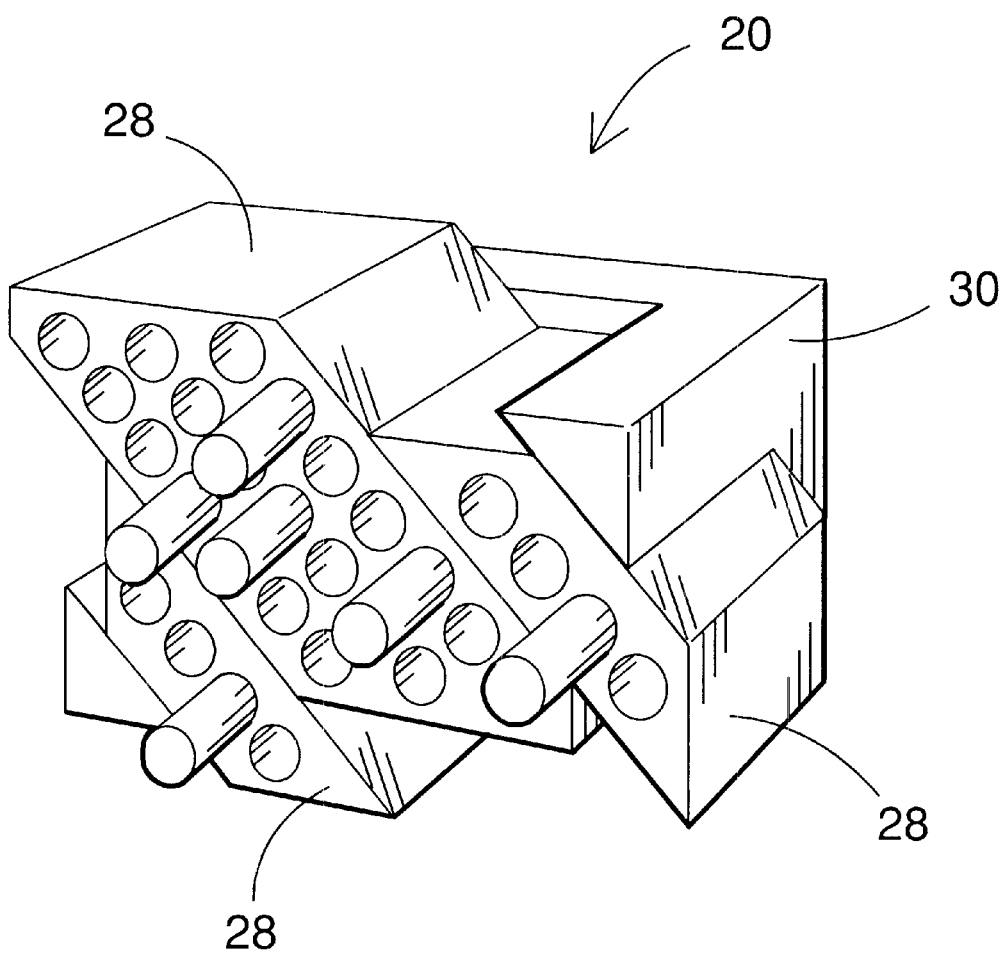
FIG. 2 is an isometric view of another embodiment of the reconfigurable multi-spindle apparatus of FIG. 1.

In one embodiment, the multi-spindle head 20 may comprise one or more spindle head modules 28, of the type shown in FIG. 2. The modules 28 may be interconnected by one or more connectors 30 that may be designed for quick assembly and disassembly. Each module 28 may be reconfigurable for frequent changes and for changes within a part family. By adding or removing modules 28, the multi-spindle head 20 may also be reconfigured for less frequent changes and for changes across part families.

Certain embodiments of the multi-spindle head 20 may be reconfigurable within a part family or reconfigurable across a part family. An embodiment of the multi-spindle head 20 may also include a dual reconfigurability within a part family and across part families as will be explained below. A "part family" is herein defined as a set of parts that share a common arrangement of specific machinable features, such as, for example, holes, and that arrangement is characteristic of the part family. The spatial arrangement of such specific machinable features that defines the part family is defined herein as "the pattern of the part family". "Reconfiguration within a part family" is herein defined as a reconfiguration of a part that changes one or more distances between certain machinable features of the part without changing the pattern of the part family. "Reconfiguration across part families" is herein defined as a reconfiguration that changes the pattern of the part family.

Figure 3:
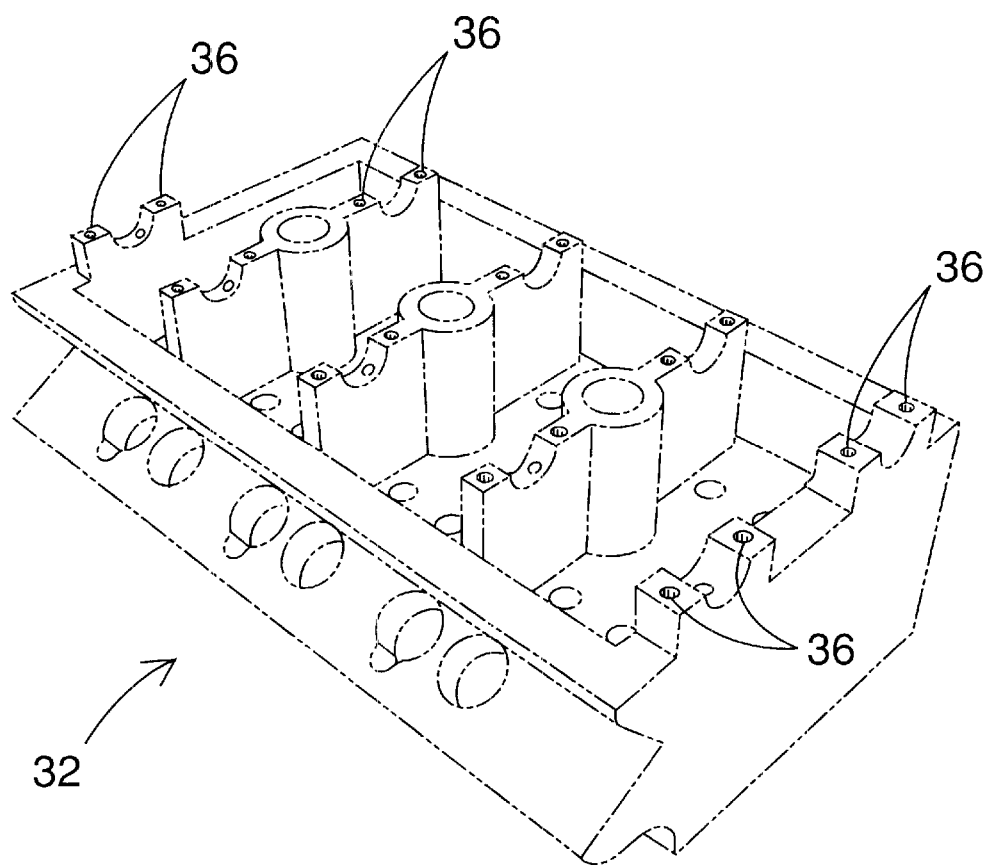
FIG. 3 is an isometric view of an exemplary V-6 engine head block.
Figure 4:
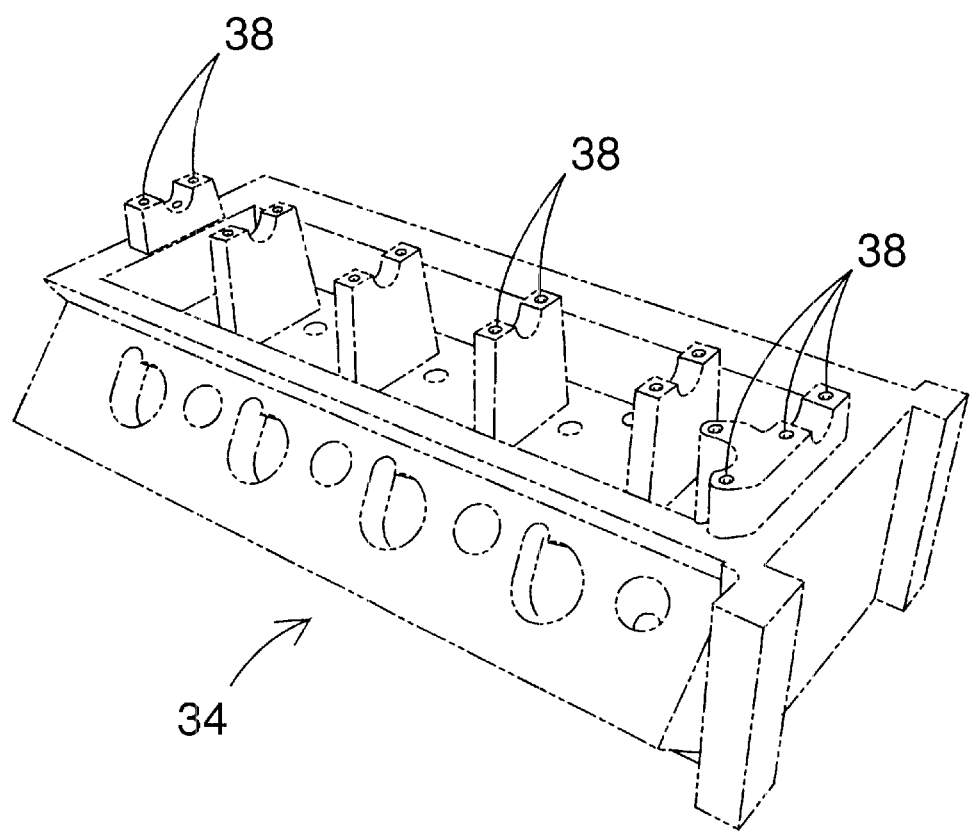
FIG. 4 is an isometric view of an exemplary V-8 engine head block.
Figure 5:
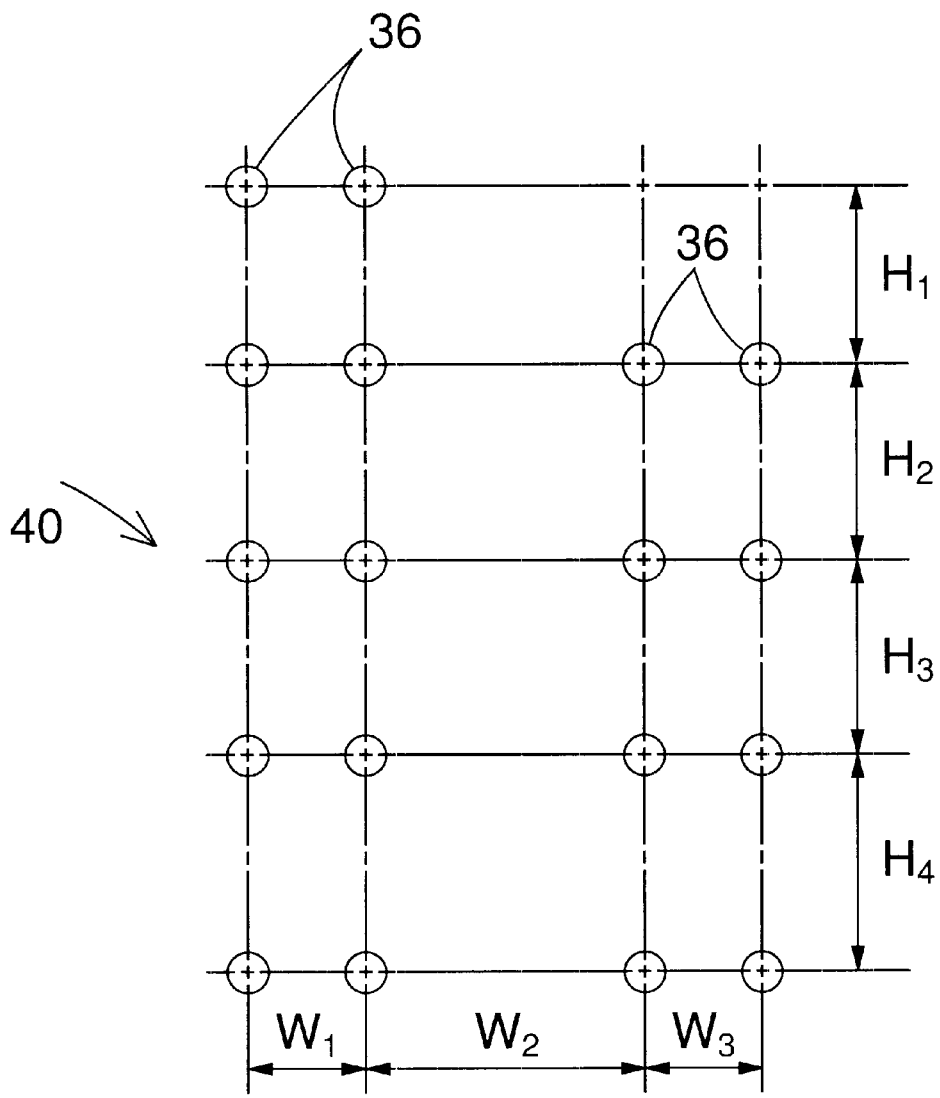
FIG. 5 is a diagram showing a pattern for the part family of the V-6 engine head block shown in FIG. 3.
Figure 6:
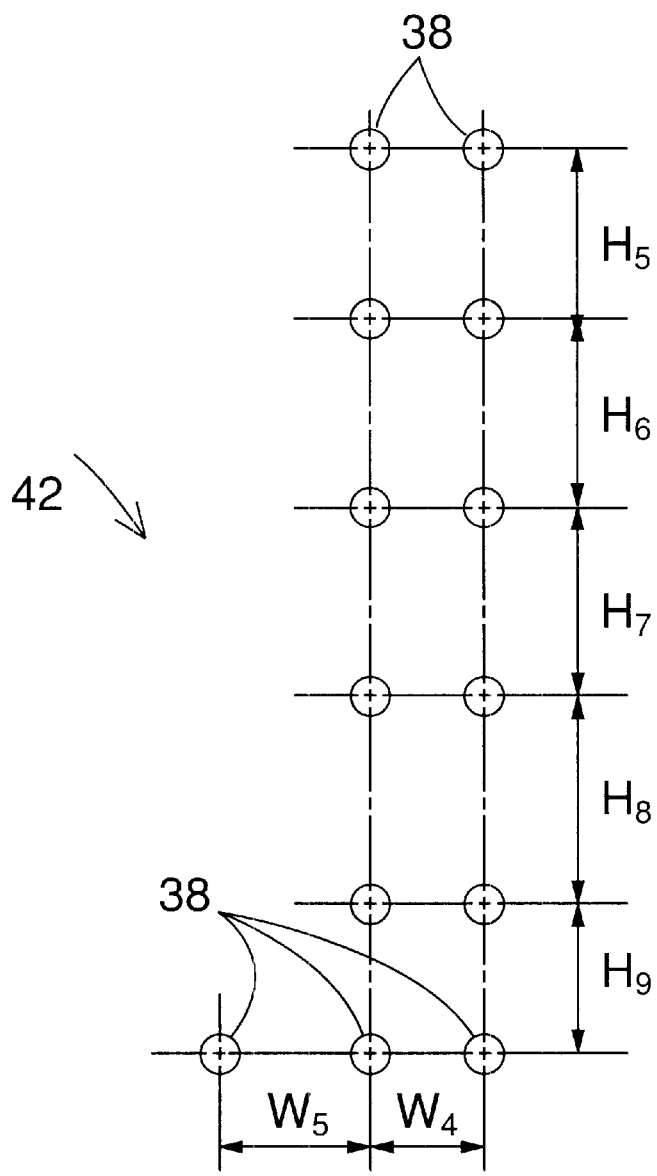
FIG. 6 is a diagram showing a pattern for the part family of the V-8 engine head block shown in FIG. 4.

By way of example only, FIGS. 3 and 4 illustrate a V-6 engine block head 32 and a V-8 engine block head 34, respectively. FIGS. 5 and 6 depict the patterns of the respective part families for the V-6 engine block head 32 and the V-8 engine block head 34. In this example of engine block heads, the machinable features are the holes 36 and 38 to be drilled in the respective engine block heads 32 and 34. The patterns 40 and 42 of the respective part families are the arrangements of the block head holes 36 and 38 respectively. See FIGS. 5 and 6.

An example of a reconfiguration within the part family of the V-6 engine block head may include changing the values of the width distances $W_i$ (i=1 to 3), and the values of the height distances $H_i$ (i=1 to 4) without changing the pattern 40 of the V-6 engine block head family. Changing the widths $W_1$ or $W_3$ is a frequent design change because it is related to a change in the diameter of the crankshaft of the engine. Accordingly, an effective and efficient reconfigurable multi-spindle head would allow quick reconfigurability of the machining tool 26 (i.e. drill head) to accommodate these changes by having such reconfigurability built-in into the spindle head module 28 itself. Although engine block heads are the part families and block head holes are the machinable features in the above example, it is to be understood that different part families and different machinable features may be equally used for practicing the invention.

To determine a combination of modules 28 that is reconfigurable across part families, such as, for example, the part families of the V-6 and V-8 engine block heads 32, 34, the respective patterns 40 and 42 may be aggregated in a single, but not necessarily unique, pattern cluster 44 from which the associated modules 28 can be determined, for example, by inspection. Pattern clustering may also be formalized by using various known design methodologies, such as graph theory.

Figure 7:
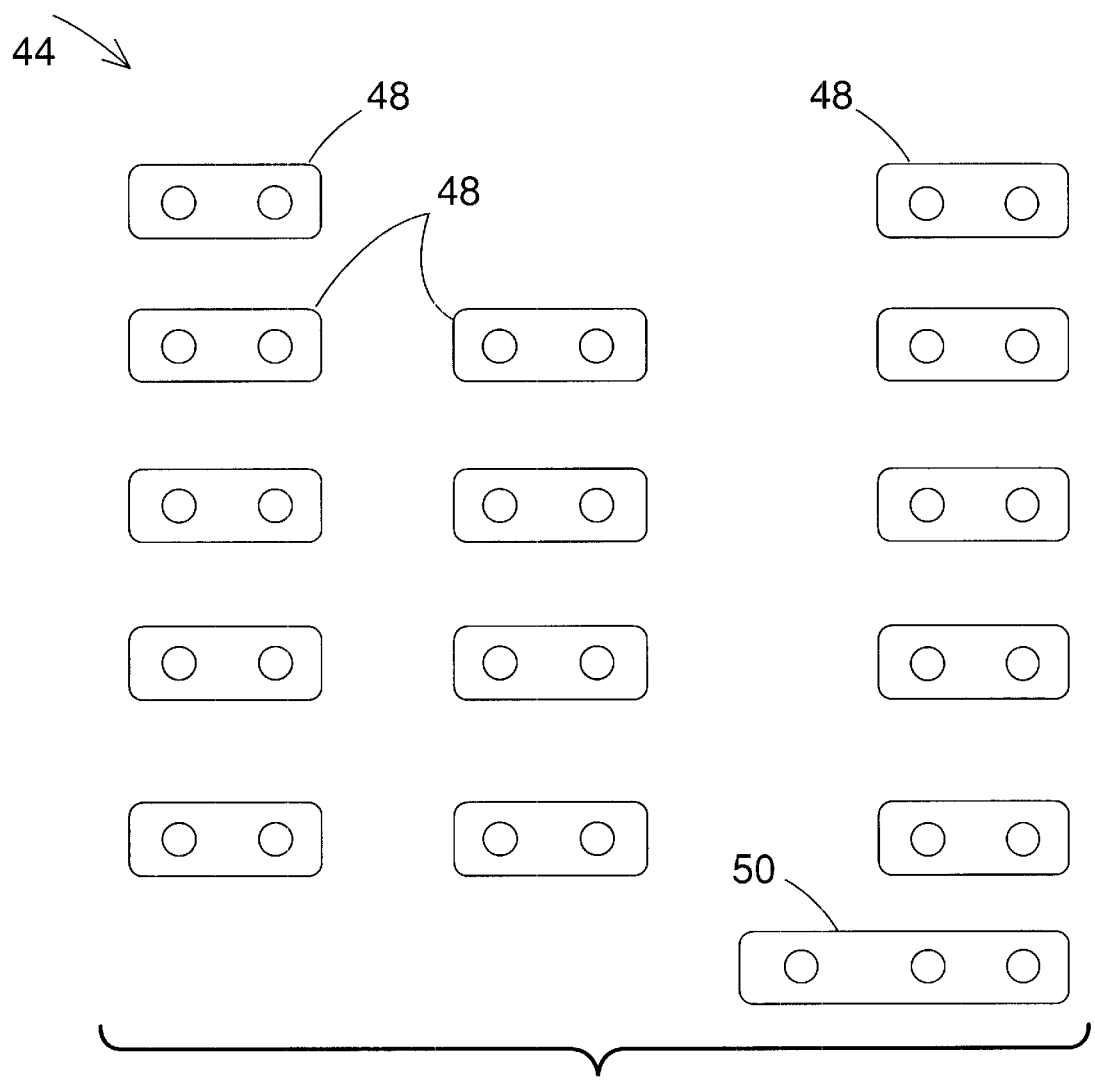
FIG. 7 is one form of a pattern cluster for the patterns of FIGS. 5 and 6.
Figure 8:
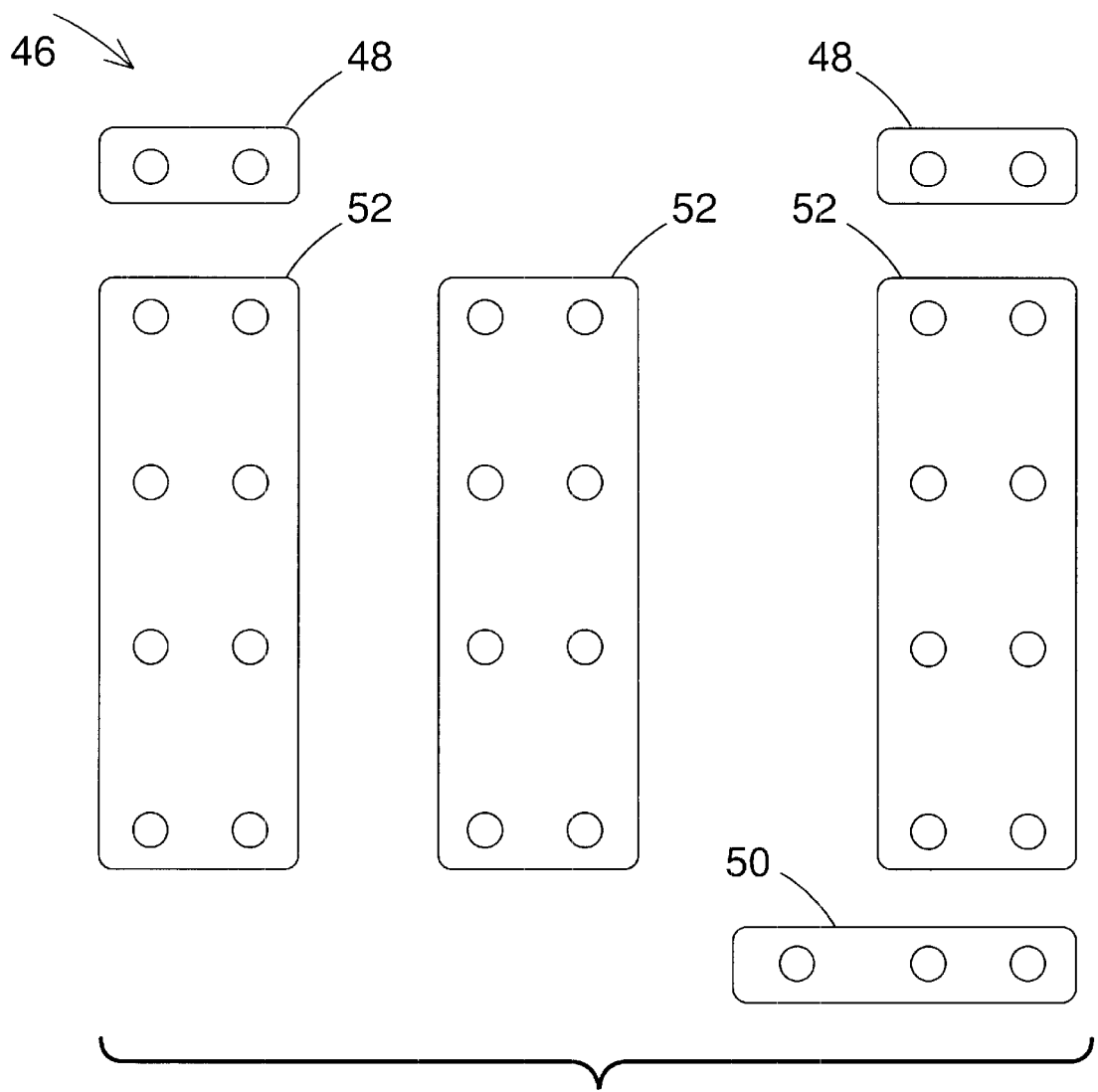
FIG. 8 is another pattern cluster for the patterns of FIGS. 5 and 6.

FIGS. 7 and 8 illustrate two such pattern clusters 44, 46. Pattern cluster 44 includes fourteen 2-tool modules 48 and a 3-tool module 50. A "N-tool" module, for example, is a module that may accommodate "N" tools in a respective number of tool holders. Pattern cluster 46 includes three 8-tool modules 52, two 2-tool modules 48 and a 3-tool module 50.

A (2N)-tool module may be built, for example, by combining N 2-tool modules. A (2N+1)-tool module may be built, for example, by combining N 2-tool modules and a module that accommodates only one tool (a 1-tool module). Although many other combinations are possible, the 2-tool module may be used as a convenient building block.

Figure 9:
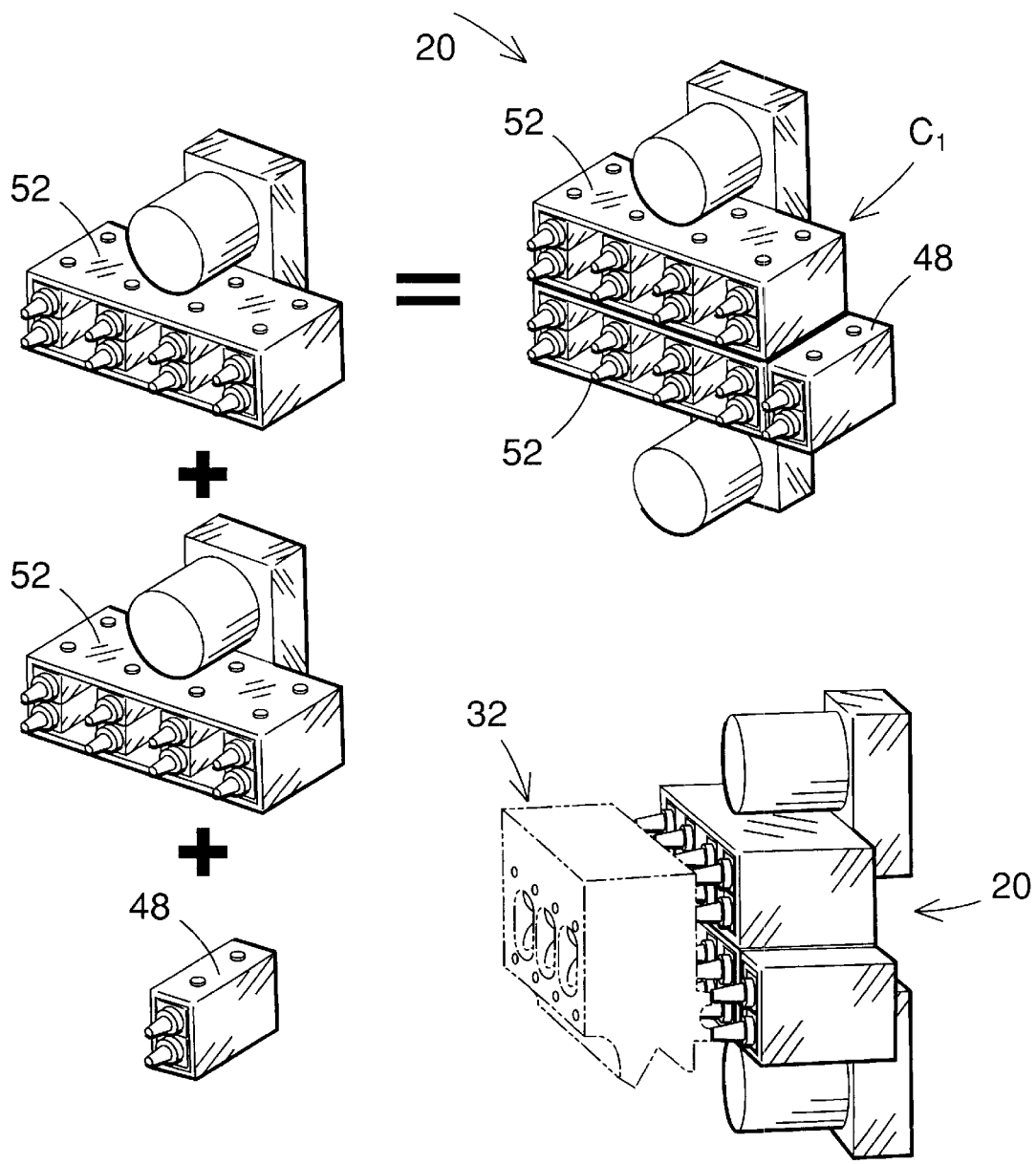
FIG. 9 is a diagram of one exemplary assembly of the reconfigurable multi-spindle apparatus of FIG. 1 shown in a configuration designated as $C_1$.
Figure 10:
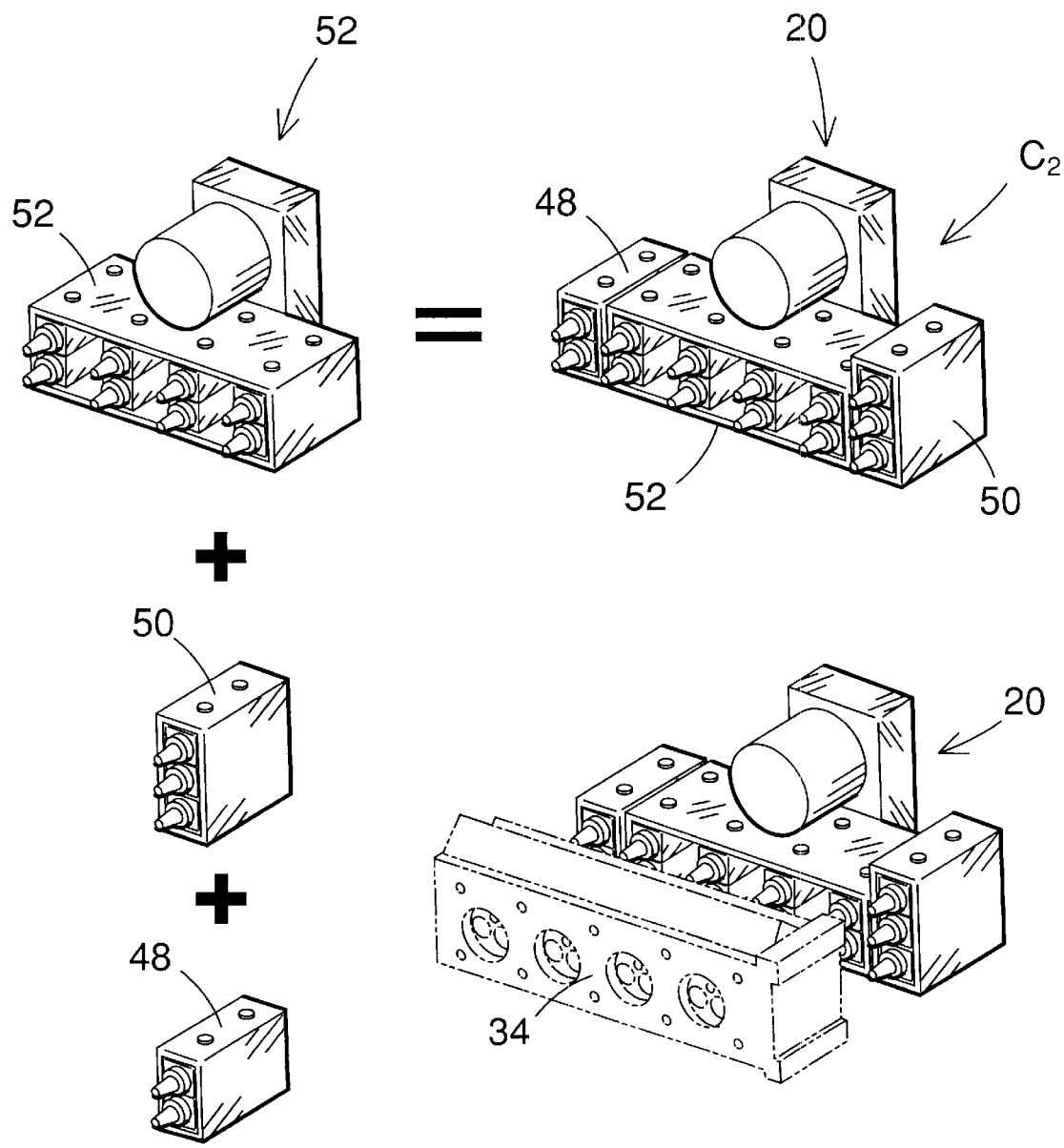
FIG. 10 is a diagram of another exemplary assembly of the reconfigurable multi-spindle apparatus of FIG. 1 shown in a configuration designated as $C_2$.

Accordingly, it will be appreciated that any number of embodiments of the multi-spindle head may be constructed by assembling together 2-tool modules and 1-tool modules, or pre-assembling 2-tool modules in larger modules, such as, for example, 3-tool modules, 4-tool modules, 8-tool modules, etc., as needed, to accommodate different sets of part families. FIG. 9 illustrates an assembly of two 8-tool modules 52 and a 2-tool module 48 to produce an embodiment of the multi-spindle head 20 in a configuration $C_1$ suitable for machining a V-6 engine block head 32. FIG. 10 illustrates an assembly of an 8-tool module 52, a 2-tool module 48 and a 3-tool module 50 to produce an embodiment of the multi-spindle head 20 in a configuration $C_2$ suitable for machining a V-8 engine block head 34. Reconfiguration from C1 to C2 is an example of reconfiguration "across part families". An example of reconfiguration "within a part family" using a 2-tool module 48 and power transmission within modules and between modules will be described below.

Figure 11:
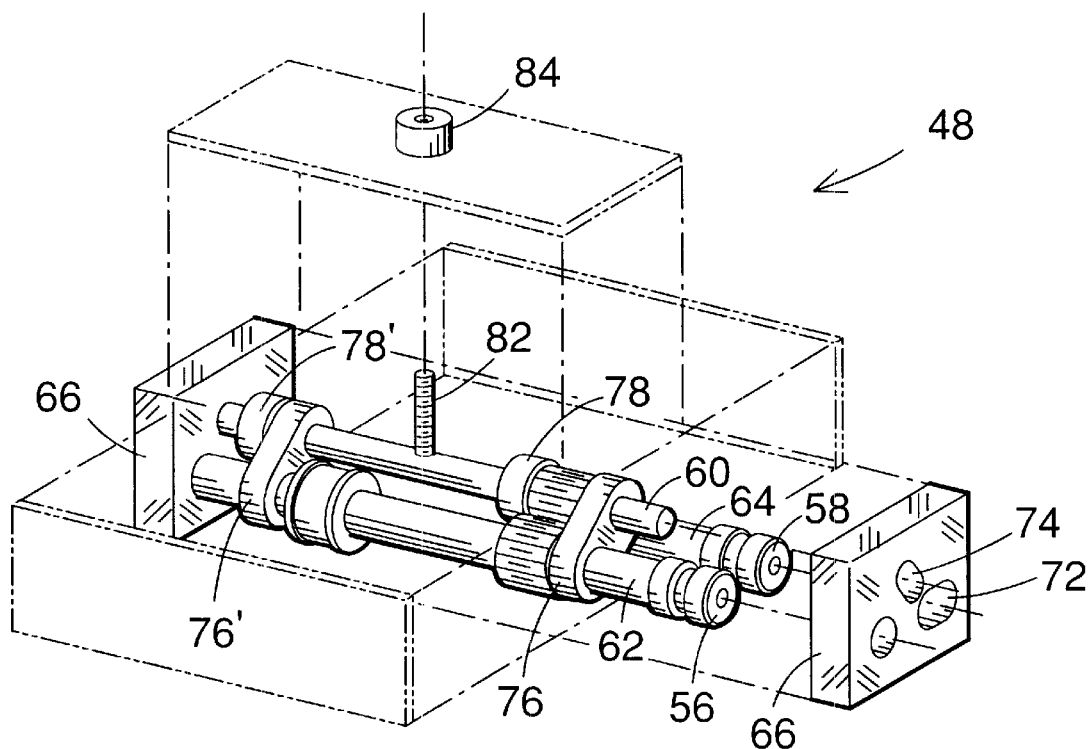
FIG. 11 is an exploded view of an embodiment of a 2-tool module for the reconfigurable multi-spindle apparatus of FIG. 1.
Figure 12:
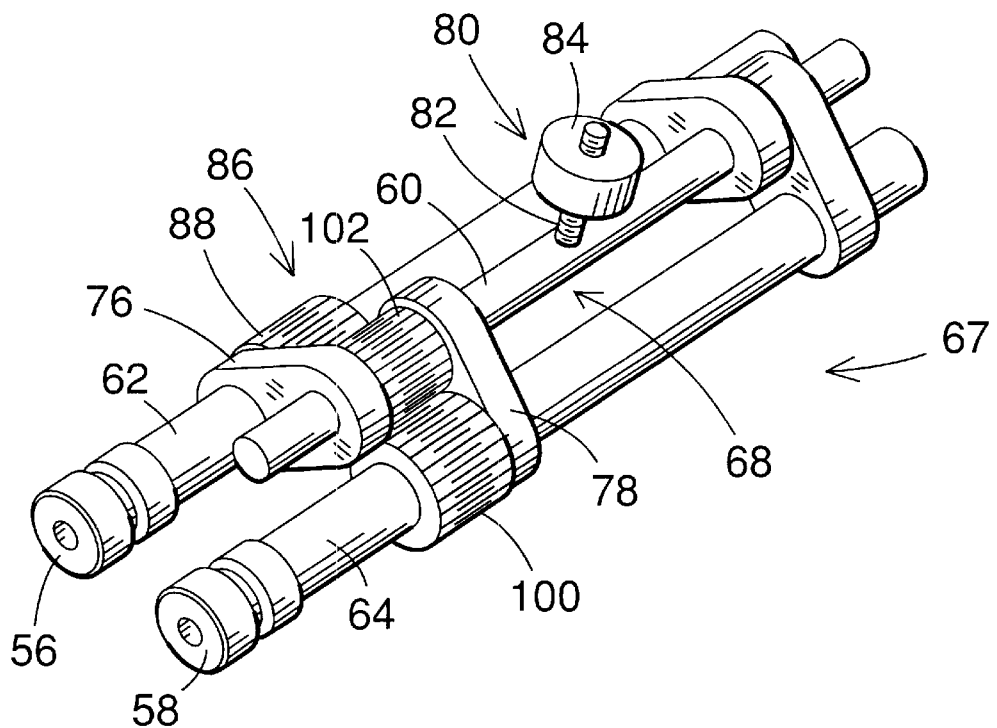
FIG. 12 is an isometric view of an embodiment of the power transmission and adjustment mechanisms of the 2-tool module of FIG. 11.
Figure 13:
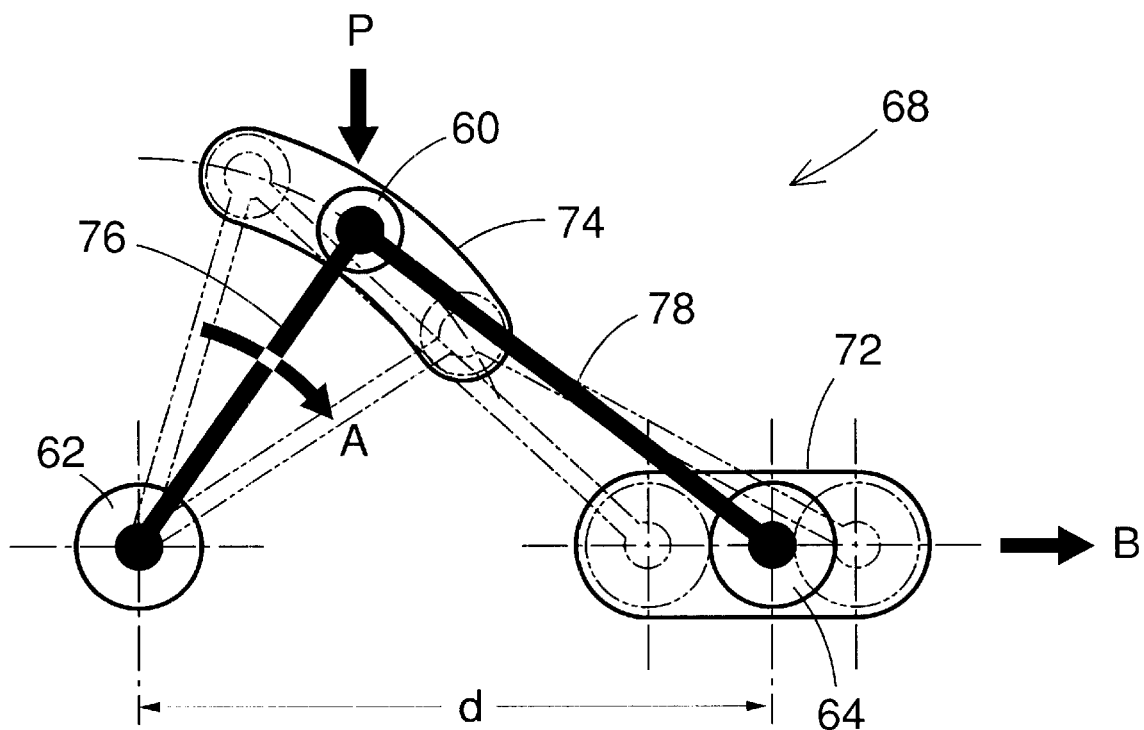
FIG. 13 is a diagrammatic depiction of an embodiment of the adjustment mechanism of FIG. 12.

An embodiment of a 2-tool module 48 is depicted in FIGS. 11–13. A 2-tool module 48 may include a first tool holder 56 mounted on a first rotatable shaft 62, and a second tool holder 58 mounted on a second rotatable shaft 64. The first and second shafts 62, 64 may be mounted on two end plates 66. The first shaft 62 may be rotatably mounted on the end plates 66 such that its position is fixed, i.e. the first shaft 62 is nonmovable, but it is capable of rotation. The second shaft 64 may be mounted on the end plates 66 such that it is rotatable and movable with respect to the first shaft 62. The movement of the second shaft 64 may be guided by shaft slots 72, wherein one shaft slot 72 is provided in each of the end plates 66.

The distance "d" between the first and second shafts 62, 64 may be adjusted by operating a distance-adjusting mechanism 67, such as, for example, a slide-crank mechanism 68 which is coupled to the first and second shafts 62, 64. See FIG. 13. The slide-crank mechanism 68 may include a movable rod (idler rod or idler axle) 60 that extends between the end plates 66. The movement of the idler rod 60 may be guided by a rod slot 74 formed in at least one of the end plates 66. The shaft slots 72 and the rod slot 74 may be shaped to provide built-in reconfigurability for the 2-tool module 48, i.e. the ability to change the distance "d" between the first and second tool holders 56, 58 and the respective first and second shafts 62, 64 without removing the module 48 from the reconfigurable multi-spindle head 20.

As can also be seen in FIG. 13, the slide-crank mechanism 68 may include a pair of first and second linkages 76, 78 that connect the idler rod 60 to the respective first and second shafts 62, 64. The slide-crank-mechanism 68 may also include a second pair of first and second linkages 76', 78' that connect the idler rod 60 to the respective first and second shafts 62, 64. See FIG. 11. Those of ordinary skill in the art will appreciate that the linkages 76, 78 are rotatably jurnaled on the idler rod to rotate therearound. It will be further appreciated that the other end of first linkage 76 is rotatably journaled on the first shaft 62 and that the other end of the second linkage 78 is rotatably journaled on the second shaft 64. An actuator 80 may be provided to apply a force to the idler rod 60 and to alter the distance d between the first and second shafts 62, 64. See FIG. 12. The actuator 80 may include, for example, a threaded fastener 82 and an idler nut 84 threaded onto the fastener 82, although other types of known actuators, either manual or automated, may used to achieve the same result.

The operation of the slide-crank mechanism 68 is illustrated in FIG. 13. A force "P" applied on the idler rod 60 in the direction shown by virtue of rotating the idler nut 84 causes the first linkage 76 to rotate about the first shaft 62 in the direction of arrow A. This action causes the idler rod 60 to travel along an arc having radius the length of the first linkage 76 and which is defined by the rod slot 74, which may be arcuate in shape to accommodate this motion of the idler rod 60. The motion of the idler rod 60 causes the second linkage 78 to rotate about the idler rod 60 and to move the second shaft 64 in the direction of arrow B guided by the shaft slot 72. The distance d between the first and second shafts 62, 64 is thereby increased. It will be understood that the same operation in reverse direction will decrease the distance d between the first and second shafts 62, 64. The shapes and sizes of the rod slot 74 and the shaft slots 72 may be chosen to restrict the distance d within desired predetermined limits.

In one embodiment, at least one gear train 86 may be used to transmit power between the first and second shafts 62, 64 and their respective tool holders 56, 58. See FIG. 12. The gear train 86 may include a first gear 88 mounted on the first shaft 62, a second gear 100 mounted on the second shaft 64 and a third or idler gear 102 mounted in the rod 60 and rotationally engaging the first and second gears 88, 100. The rod 60 serves as an idler axle for the third gear 102. In other embodiments, additional gear trains may be used.

Figure 14:
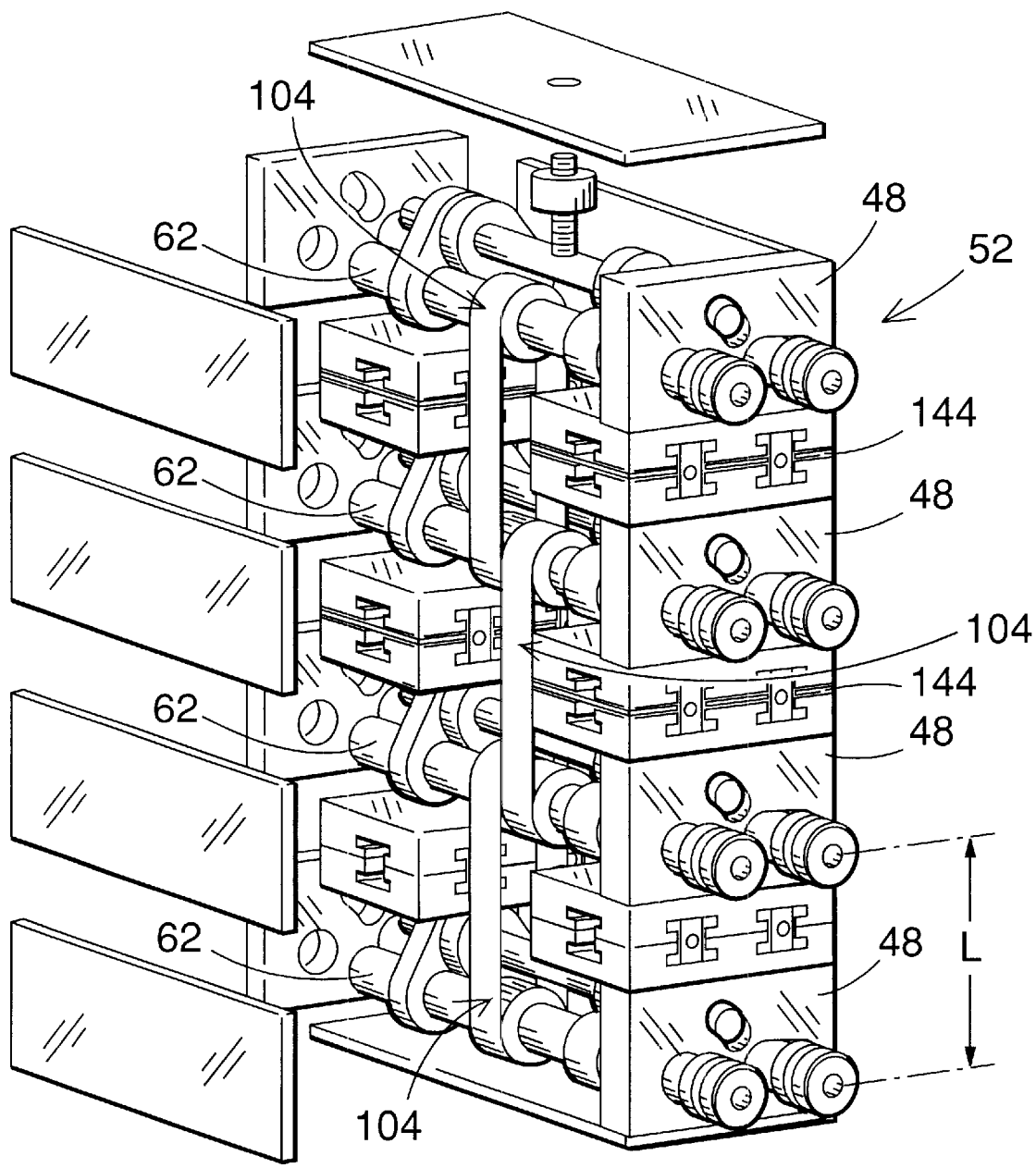
FIG. 14 is a partially exploded isometric view of an embodiment of an 8-tool module for the reconfigurable multi-spindle apparatus of FIG. 1.

Power between two 2-tool modules 48 may be transmitted by connecting the corresponding first shafts 62, which may be fixed in location as described above, with a power transmission mechanism, such as, for example, a chain or belt and pulley mechanism 104, as shown in FIG. 14. Power is provided by a conventional connection to a machining device motor.

Figure 19:
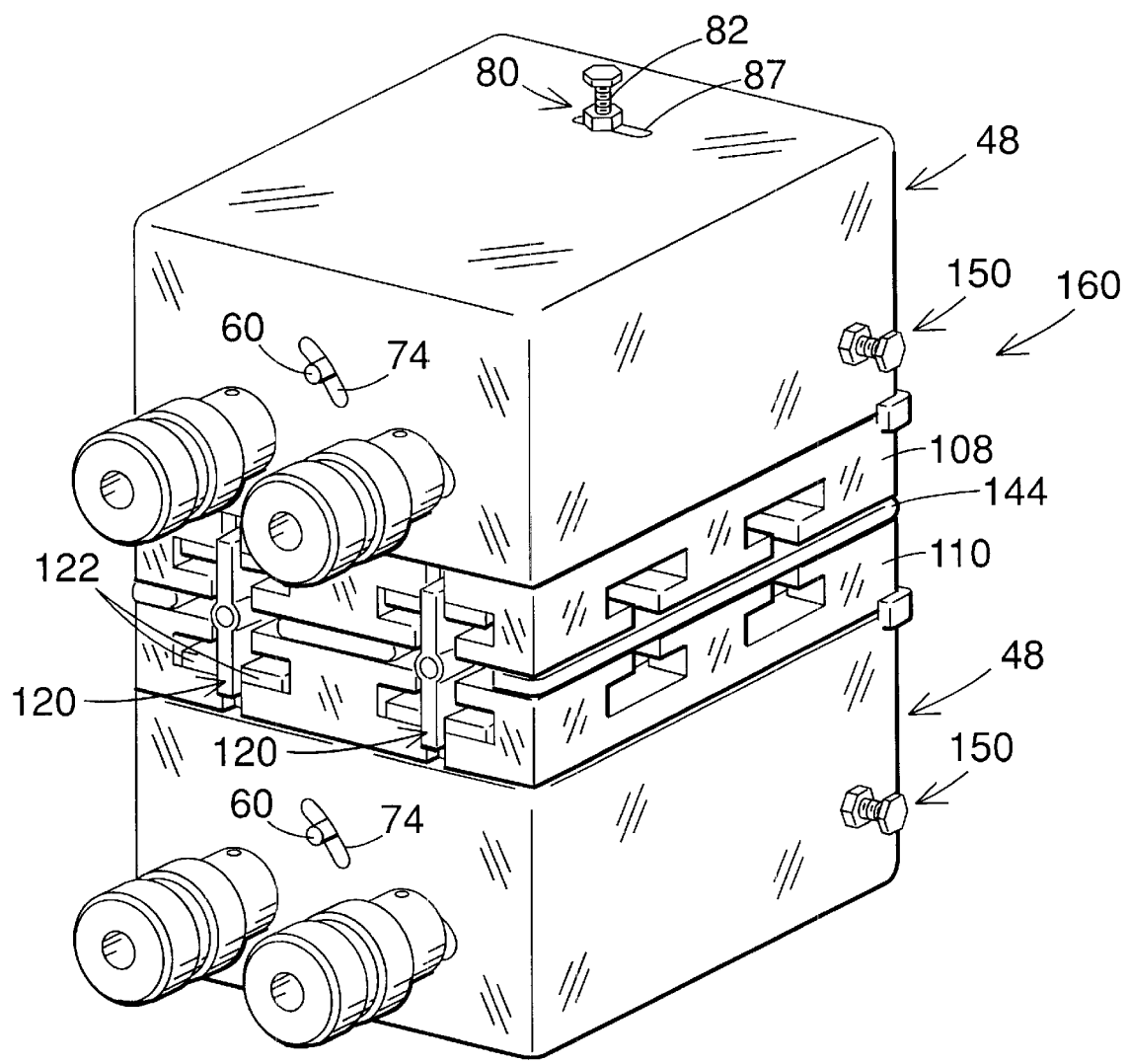
FIG. 19 is an isometric view of an embodiment of a 4-tool module for the reconfigurable multi-spindle apparatus of FIG. 1.

Two 2-tool modules 48 may be interconnected to form a 4-tool module by using at least one, but preferably two, connector assemblies 106. The skilled artisan will readily appreciate that, by repeating the interconnecting process, a 6-tool module, an 8-tool module, etc., may be assembled. Similarly, any other module 28, or a desired configuration of the multi-spindle head 20 may be built, either entirely by 2-tool modules or by also adding 1-tool modules. See FIGS. 14, 15, and 19.

Figure 18:
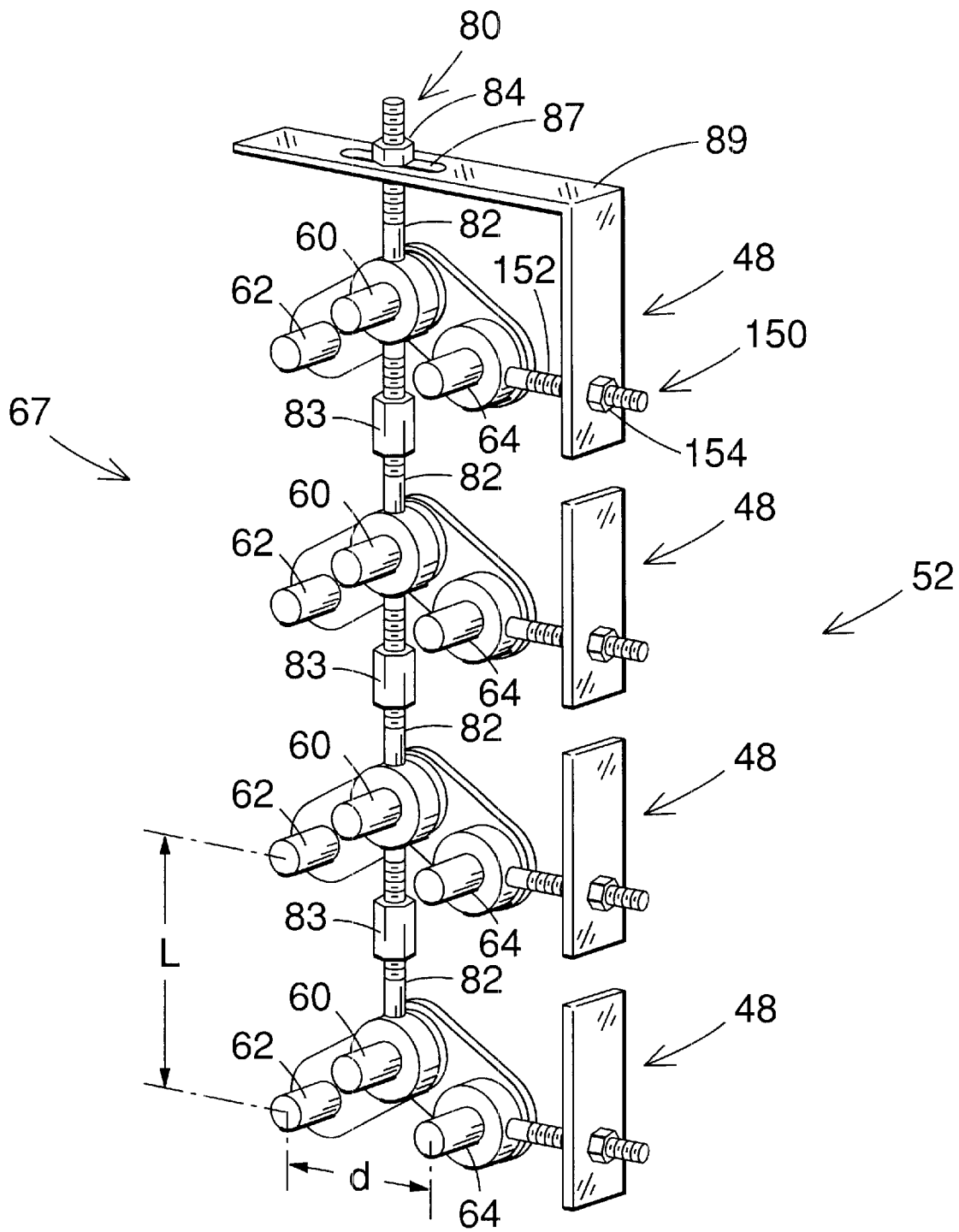
FIG. 18 is an isometric view of an embodiment of a distance-adjusting mechanism of the reconfigurable multi-spindle apparatus of FIG. 1.

An embodiment of the distance-adjusting mechanism 67 implemented for an 8-tool module is shown in FIG. 18. The threaded fasteners 82 of any two adjacent 2-tool modules 48 may be removably interconnected by sleeves 83, which may be also used to adjust the distance L between any 2-tool modules 48. A rotation of the idler nut 84 transmits an equal force to each of the idler rods 60, such that the distance d between the first and second shafts 62, 64 of each 2-tool module 48 is changed concurrently without disassembling the 2-tool modules 48 from the 8-tool module 52.

Figure 20:
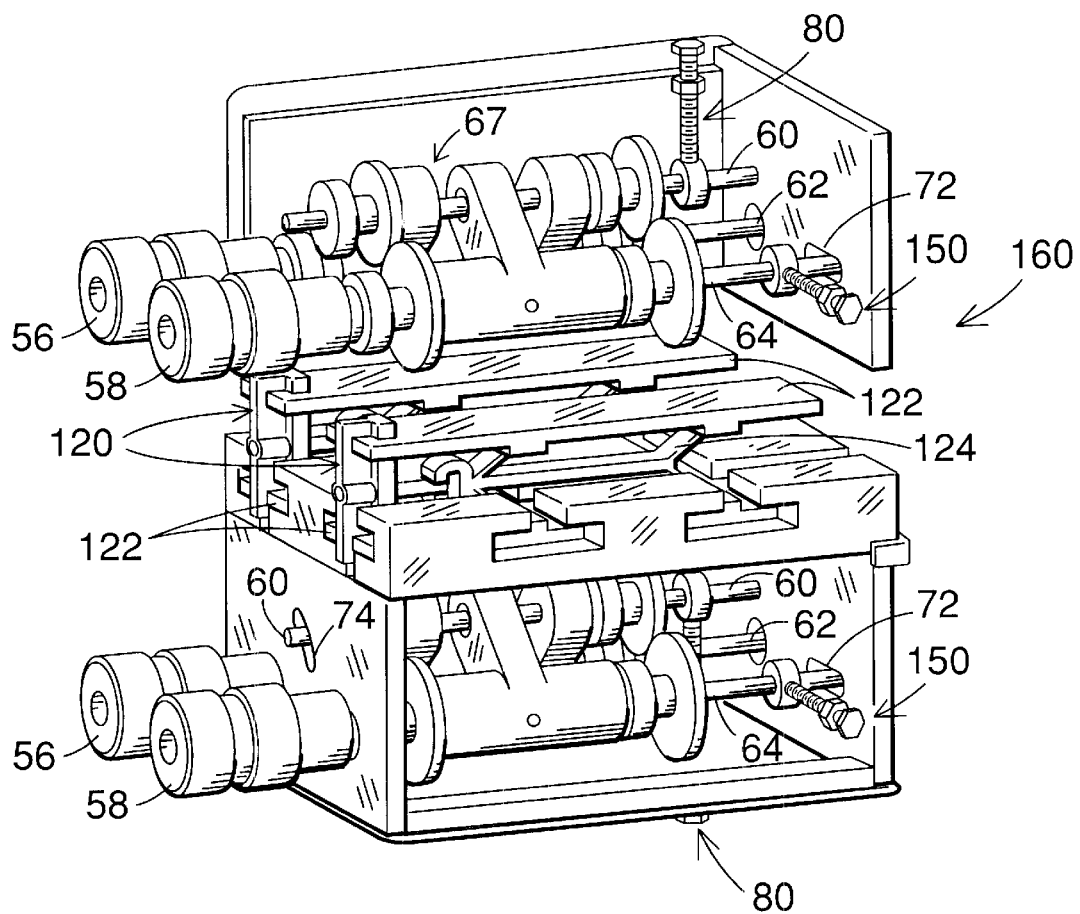
FIG. 20 is a partial isometric view of the 4-tool module of FIG. 19.
Figure 21:
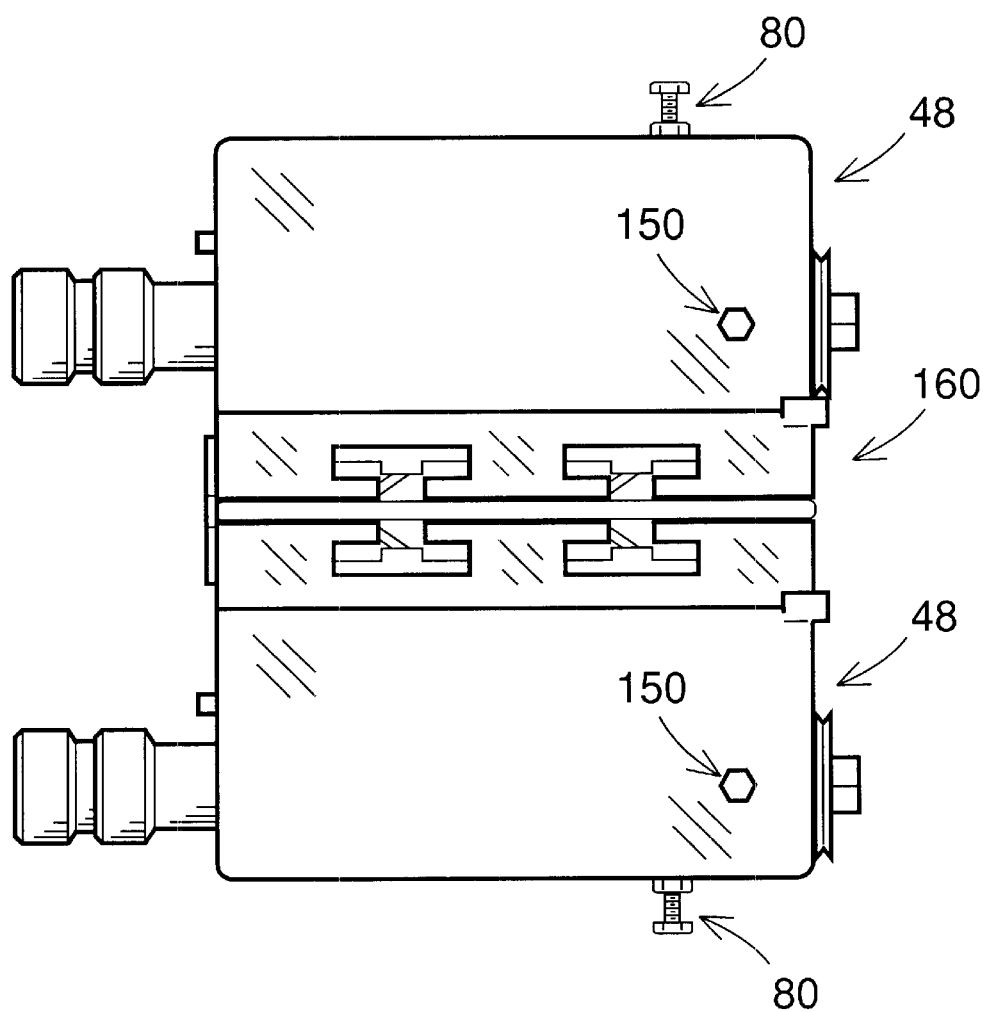
FIG. 21 is a right side view of the 4-tool module of FIG. 19.

Alternatively, each 2-tool module 48 may be provided with an independent actuator 80, see FIGS. 12 and 20, The actuators 80 of the inner modules may be accessed by removing any intervening spacers 144 or interface connectors 120.

A top guiding slot 87 may be provided on an upper housing wall 89 of an end module 48 to accommodate the motion of the idler rod 60. Additionally, a constraint mechanism 150 may be provided for each 2-tool module. The constraint mechanism 150 may include a constraint rod 152 and a constraint nut 154 for applying a constraining force on the second shaft 64. The actuator 80 and the constraint mechanism 150 are adequate to constrain the distance-adjusting mechanism 67 in a desired configuration.

A connector assembly 106 may include first and second slotted plates 108, 110 that may each include at least one slot 112, 114 respectively. See FIG. 15. Each of the first and second slotted plates 108, 110 may be connected or attached to a respective surface of a spindle head module 28, such as, for example, a 2-tool module 48, at the interface with another such module, by welding or with removable or non removable fasteners. In applications wherein quick assembly and disassembly is desired, releasable fasteners, such as snap-on connectors, etc. (not shown) may be employed.

In this embodiment, the first and second slotted plates 108, 110 are positioned for attachment so that the slots 112 of the first slotted plate 108 are confrontingly aligned with the slots 114 of the second slotted plate 110 to form interface openings generally designated as 116. In one embodiment, the slots 112, 116 are T-shaped and the corresponding interface openings 116 are I-shaped, although many other shapes are within the purview of a skilled artisan.

Figure 15:
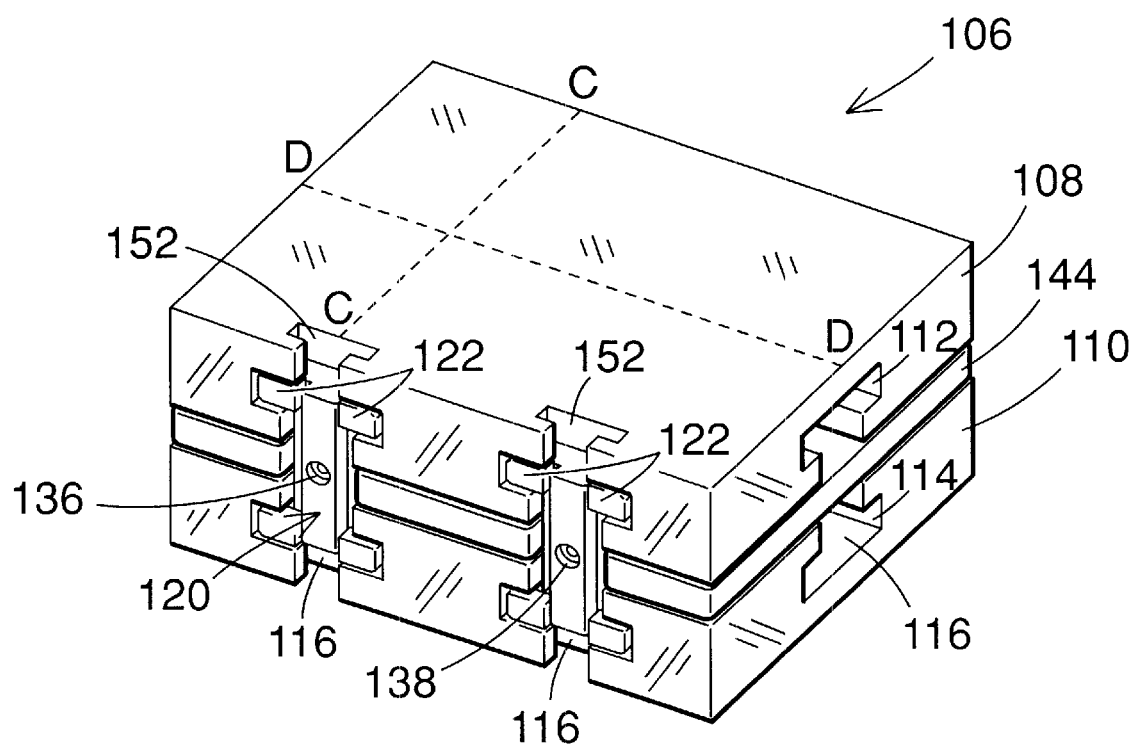
FIG. 15 is an isometric view of an embodiment of a connector assembly of the reconfigurable multi-spindle apparatus of FIG. 1.

In one embodiment, the connector assembly 106 may include two interface openings 116 running parallel to a direction indicated by a first axis C—C, and one interface opening 116 oriented transversely to the first axis C—C and parallel to a second axis D—D. The first axis C—C may be, for example, parallel to one side of the slotted plates 108, 110. Certain interface openings 116 that are parallel to the first axis C—C may be used, for example, to interconnect a number of 2-tool modules 48 to form larger modules 28, such as an 8-tool module 52. Certain interface openings 116 parallel to the second axis D—D may be used to interconnect two such 8-tool modules 52, and so on. The arrangement of the interface openings 116 shown in FIG. 15 is merely exemplary. Many other arrangements including additional or fewer interface openings 116 are within the purview of a skilled artisan.

The connector assembly 106 may also include a compliant interface connector 120 that is sized to be removably received into any of the interface openings 116. The compliant interface connector 120, best shown in FIG. 16, may include a clamping mechanism 128 and a compliant clamp 130. The compliant clamp 130 may include two substantially rigid clamping plates 122 and at least one compliant member 124 that may be fabricated from a flexible material such as, for example, metal or polymeric sheet. In the embodiment depicted in FIG. 16, two compliant members 124 are arranged in spaced apart relationship to each other and extend between the clamping plates 122. The compliant member 124 may be mounted on a substantially rigid support plate 126 and connected to the clamping plates 122. It will be appreciated that other arrangements for supporting the compliant member 124 between the clamping plates 122 are within the purview of a skilled artisan. The compliant clamp 130 may be formed as one integral piece or as an assembly of inter-connectable parts from a variety of materials, including metal and polymeric materials.

Figure 17:
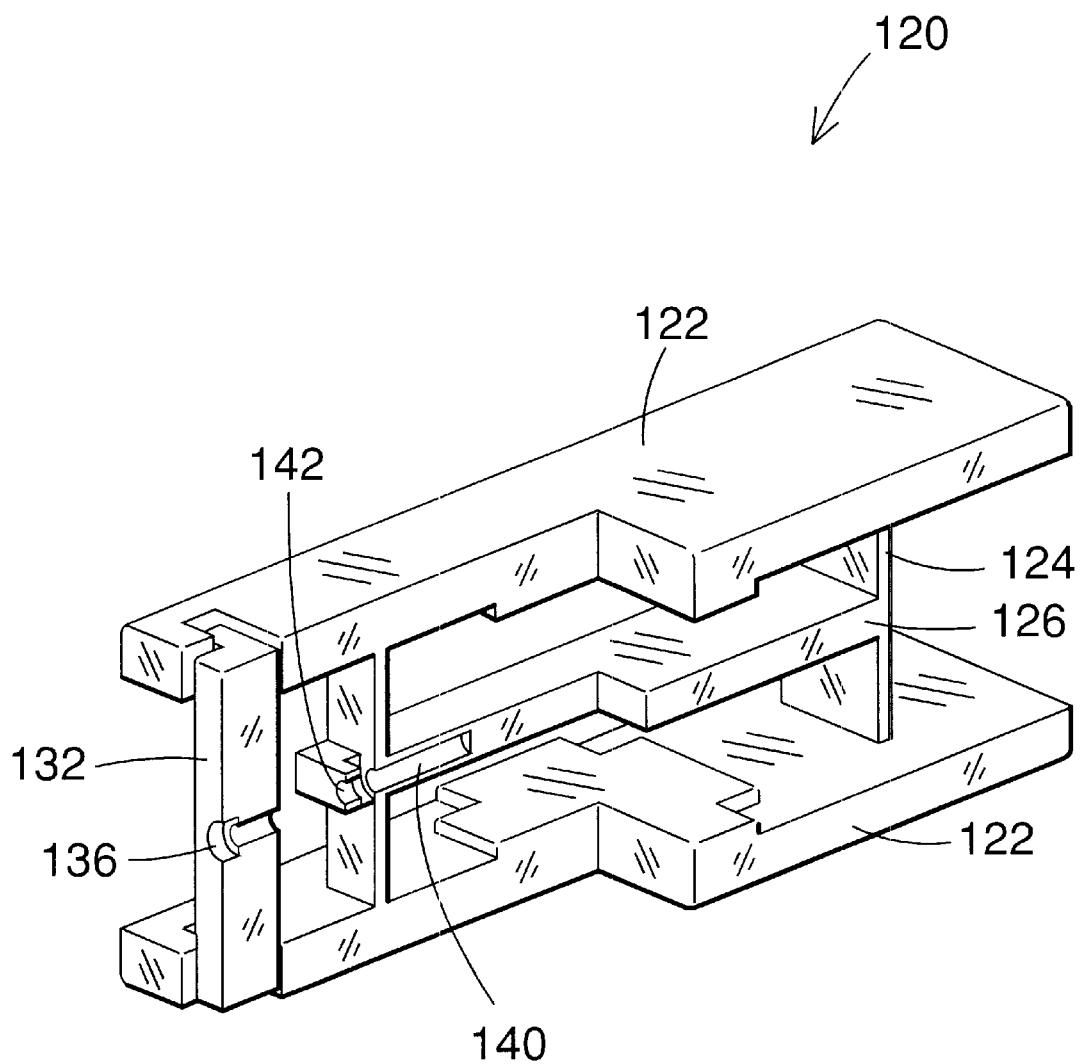
FIG. 17 is a partially sectioned isometric view of an embodiment of an interface connector of the connector assembly of FIG. 15.

The clamping mechanism 128 may further include an actuation guide 132, which may be substantially rigid and be sized for engagement with the clamping plates 122. Additional slots 152 may be provided in the slotted plates 108, 110 to accommodate actuation guides 132 of longer lengths. See FIG. 15. The actuation guide 132 may be T-shaped, for example, to be received within a correspondingly shaped T-shaped channel 134 formed at one end of each clamping plate 122. The actuation guide 132 may include a hole 136 through which a threaded positioning fastener 138 may be inserted. The support plate 126 may include a guiding aperture 140 into which the positioning fastener 138 is received. A threaded nut 142 or other fastener attached to or formed in an end of the support plate 126 secures the positioning fastener 138 in position for clamping. See FIG. 17.

Figure 16:
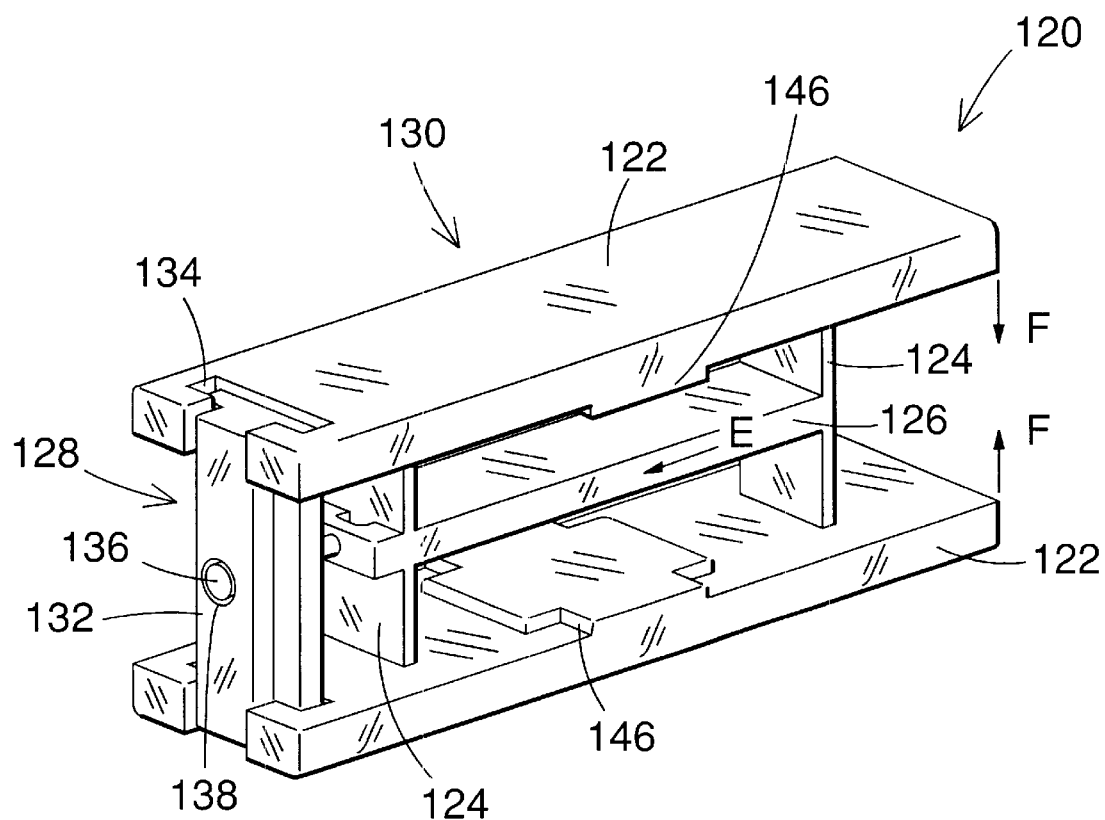
FIG. 16 an isometric view of an embodiment of an interface connector of the connector assembly of FIG. 15.

In operation, as the positioning fastener 138 is rotated in a clockwise direction, the support plate 126 is drawn toward the actuation guide 132 in the direction represented by arrow "E" in FIG. 16, which, in turn, causes the compliant members 124 to flex, thereby bringing the clamping plates 122 toward each other as represented by arrows "F" in FIG. 16. The skilled artisan will appreciate that the clamping plates 122 of this unique and novel clamping assembly transmit distributed clamping forces to the respective slotted plates 108, 110, to clamp the spindle head modules 28 to which they are attached and to form larger spindle head modules 28. Starting, for example, with one 2-tool module 48 and connecting successively additional 2-tool modules 48, the 8-tool module 52 shown in FIG. 14 may be built. In a similar manner, two 8-tool modules 52 may be attached to each other by using compliant interface connectors 120 in appropriately oriented and unused interface openings 116.

The distance L between two 2-tool modules 48 may be also adjusted to provide additional reconfigurability. A convenient and quick adjustment may be provided by inserting at least one, but preferably two, spacers 144 between the slotted plates 108, 110 which are attached to respective modules 48. See FIGS. 15 and 19. The spacers 144 are sized to accommodate the compliant interface connectors 120. In the embodiment of the connector assembly 106 illustrated in FIG. 15, the spacer 144 is E-shaped for this purpose, although other shapes may also be used by a skilled artisan.

The compliant interface connector 120 may further include alignment guides 146 for accurate positioning of the spindle head modules 28 relatively to each other. See FIG. 16. The alignment guides may be 146 formed on the inner surfaces of the clamping plates 122 and have profiles 148 shaped to guide and accurately align the slotted plates 108, 110 during clamping in one operation by the action of positioning fastener 138.

Figure 22:
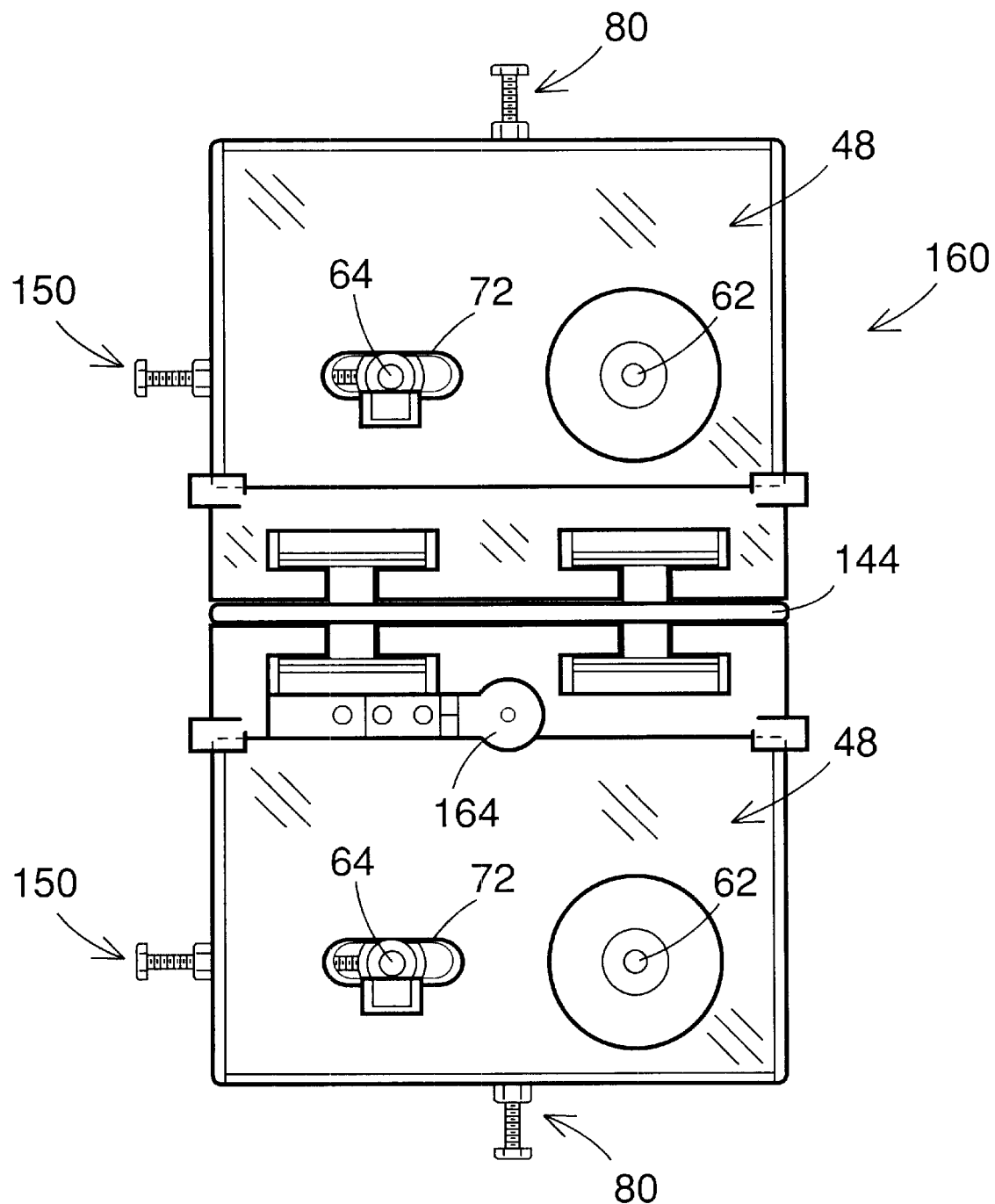
FIG. 22 is a rear view of the 4-tool module of FIG. 19.

FIGS. 19–22 illustrate an embodiment of a 4-tool module 160 that includes two 2-tool modules 48. In this embodiment, the actuators 80 of each 2-tool module 48 are not interconnected and may be operated independently, so that the distance between the first and second shafts 60, 62 of each module may be adjusted independently. FIG. 20 depicts an embodiment of the interface connector 120 that includes V-shaped compliant members 124 supported between the clamping plates 122. The pulleys 162 of the belt and pulley mechanism 104 that transmits power between the two 2-tool modules 48 are shown in FIG. 22. A belt tension control mechanism may also be provided.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A reconfigurable multi-spindle apparatus for use with a machining device in a plurality of configurations, the multi-spindle apparatus comprising:
   at least first and second rotatable tool holders mounted on the multi-spindle apparatus and separated by a distance, wherein the first tool holder is mounted on a fixed rotatable shaft; and the second tool holder is mounted on a movable rotatable shaft;
   a mechanism coupling the first tool holder to the second tool holder for transmitting rotational power from the first tool holder to the second tool holder; and
   a mechanism coupled with the first and second tool holders for changing the distance between the first and second tool holders without removing the first and second tool holders from the multi-spindle apparatus such that the multi-spindle apparatus is reconfigured from a first configuration to a second configuration of said plurality of configurations, wherein the mechanism for changing the distance between the first and second tool holders comprises a slide crank mechanism having a movable rod and at least one pair of first and second linkages rotatably connecting the rod to the respective first and second shafts.

2. The reconfigurable multi-spindle apparatus of claim 1, wherein said first and second configurations comprise configurations within a part family.

3. The reconfigurable multi-spindle apparatus of claim 1, wherein at least one configuration is a configuration of machinable features.

4. The reconfigurable multi-spindle apparatus of claim 3, wherein the machinable features include holes.

5. A reconfigurable multi-spindle apparatus for use with a machining device in a plurality of configurations across part families, the multi-spindle apparatus comprising:
   a plurality of spindle head modules;
   a plurality of power transmission mechanisms, wherein each power transmission mechanism reconfigurably connects two of said plurality of spindle head modules for power transmission therebetween; and
   a plurality of connector assemblies, wherein each spindle head module is reconfigurably connected with at least another one of said plurality of spindle head modules by at least one of said plurality of connector assemblies in each of said plurality configurations, and wherein each connector assembly comprises:
   two slotted plates attachable to two of said spindle head modules respectively, each plate having a T slot and forming an interface opening therebetween; and
   a compliant interface connector sized for receipt in said interface opening and operable to align and clamp said spindle head modules to each other.

6. The reconfigurable multi-spindle apparatus of claim 1, wherein the mechanism for transmitting power comprises at least one gear train including first gear mounted on the first shaft, a second gear mounted on the second shaft, and a third gear mounted on the rod and rotatably engaging the first and second gears.

7. The reconfigurable multi-spindle apparatus of claim 1, wherein the slide crank mechanism further comprises a second pair of first and second linkages rotatably connecting the rod to the respective first and second shafts and spaced apart from the first pair of first and second linkages.

8. The reconfigurable multi-spindle apparatus of claim 7, further comprising an actuator coupled to the rod for applying a force to the rod.

9. The reconfigurable multi-spindle apparatus of claim 8, further comprising a mechanism coupled to the second shaft for guiding the motion of the second shaft during reconfiguration.

10. The reconfigurable multi-spindle apparatus of claim 9, wherein the mechanism for guiding the motion of the second shaft comprises two end plates supporting the fixed shaft thereon, each end plate including a shaft slot for reconfigurably receiving the second shaft.

11. The reconfigurable multi-spindle apparatus of claim 8, further comprising a mechanism coupled to the rod for guiding the motion of the rod during reconfiguration.

12. The reconfigurable multi-spindle apparatus of claim 11, wherein the mechanism for guiding the motion of the rod comprises a rod slot on an end plate connected to the multi-spindle apparatus, the rod slot reconfigurably receiving the rod.

13. The reconfigurable multi-spindle apparatus of claim 12, wherein the mechanism for guiding the motion of the rod further comprises a top guiding slot on a top plate connected to multi-spindle apparatus.

14. The reconfigurable multi-spindle apparatus of claim 10, further including a constraint mechanism coupled to the second shaft for applying a constraining force on the second shaft.

15. The reconfigurable multi-spindle apparatus of claim 5, wherein at least one of the spindle head modules comprises:

first and second tool holders mounted on the multi-spindle apparatus and separated by a distance;

a mechanism coupled to the first and second tool holders for transmitting power from the first tool holder to the second tool holder; and a mechanism coupled to the first and second tool holders for changing the distance between the first and second tool holders without removing the tool holders from the multi-spindle apparatus such that the multi-spindle apparatus is reconfigured to a plurality of configurations within a part family.

16. The reconfigurable multi-spindle apparatus of claim 15, wherein the plurality of configurations within the part family includes a configuration of machinable features.

17. The reconfigurable multi-spindle apparatus of claim 16, wherein the machinable features include holes.

18. The reconfigurable multi-spindle apparatus of claim 15, wherein the first tool holder is mounted on a fixed rotatable shaft; the second tool holder is mounted on a movable rotatable shaft; and the mechanism for changing the distance between the first and second tool holders comprises a slide crank mechanism having a movable rod and at least one pair of first and second linkages rotatably connecting the rod to the respective first and second shafts.

19. The reconfigurable multi-spindle apparatus of claim 18, wherein the mechanism for transmitting power comprises a gear train including first gear mounted on the first shaft, a second gear mounted on the second shaft, and a third gear mounted on the rod and rotatably engaging the first and second gears.

20. The reconfigurable multi-spindle apparatus of claim 18, wherein the slide crank mechanism further comprises a second pair of first and second linkages spaced apart from the first pair of first and second linkages and rotatably connecting the rod to the respective first and second shafts.

21. The reconfigurable multi-spindle apparatus of claim 20, further comprising a mechanism coupled to the rod for applying a force to the rod.

22. The reconfigurable multi-spindle apparatus of claim 5, wherein the compliant interface connector comprises:

two substantially rigid clamping plates sized for engagement with the slotted plates;

a compliant member mounted on a substantially rigid support plate and attached to the clamping plates;

and a clamping mechanism for exerting a force on the support plate such that a corresponding deflection of the compliant member causes the clamping plates to clampingly engage said two spindle head modules.

23. The reconfigurable multi-spindle apparatus of claim 22, wherein the clamping mechanism includes an actuation guide sized for engagement with the clamping plates and a positioning fastener received in the actuation guide.

24. The reconfigurable multi-spindle apparatus of claim 23, wherein the support plate includes a guiding aperture for receiving the positioning fastener.

25. The reconfigurable multi-spindle apparatus of claim 22, wherein the compliant interface connector further comprises alignment guides on the clamping plates for aligning said spindle head modules.

26. The reconfigurable multi-spindle apparatus of claim 22, further including a spacer sized to be received between the two slotted plates without interfering with operation of the compliant interface connector.

27. The reconfigurable multi-spindle apparatus of claim 21, further comprising a mechanism coupled to the second shaft for guiding the motion of the second shaft during reconfiguration.

28. The reconfigurable multi-spindle apparatus of claim 27, wherein the guiding mechanism for the second shaft includes two end plates supporting the first shaft thereon, each end plate including a shaft slot for reconfigurably receiving the second shaft.

29. The reconfigurable multi-spindle apparatus of claim 21, further comprising a mechanism coupled to rod for guiding the motion of the rod during reconfiguration.

30. The reconfigurable multi-spindle apparatus of claim 29, wherein the guiding mechanism for the rod includes a rod slot on an end plate supporting the first shaft, the rod slot reconfigurably receiving the rod.

* * * * *